United States Patent [19]
Haskell et al.

[11] Patent Number: 5,604,502
[45] Date of Patent: Feb. 18, 1997

[54] MOTION VIDEO COMPRESSION SYSTEM WITH INVERSE DISCRETE COSINE TRANSFORM MISMATCH CONTROL

[75] Inventors: Barin G. Haskell, Tinton Falls; Li Yan, Holmdel, both of N.J.

[73] Assignee: Lucent Technologies Inc., Murray Hill, N.J.

[21] Appl. No.: 215,334

[22] Filed: Mar. 21, 1994

[51] Int. Cl.$^6$ ............................................. H03M 1/00
[52] U.S. Cl. ............................................. 341/200
[58] Field of Search ............................................. 341/200

[56] References Cited

U.S. PATENT DOCUMENTS

| | | | |
|---|---|---|---|
| 4,540,973 | 9/1985 | Grallert | 340/347 |
| 4,734,767 | 3/1988 | Kaneko et al. | |
| 5,101,280 | 3/1992 | Moronaga et al. | 358/426 |
| 5,121,216 | 6/1992 | Chen et al. | 358/261.3 |

FOREIGN PATENT DOCUMENTS

0509576A2  10/1991  European Pat. Off.

OTHER PUBLICATIONS

W. Jass et al., "A Versatile DCT Coding System for HDTV with Interlaced and Progressive Scanning," *Signal Processing: Image Communication*, vol. 4, No. 4, Aug. 1, 1992, pp. 389–399.

"IEEE Standard Specifications for the Implementions of 8×8 Inverse Discrete Cosine Transform," *IEEE STD 1180–1990*, Mar. 18, 1991, New York, New York, pp. 1–13.

Yasuo Katayana, "Coding of Moving Pictures and Associated Audio–Protection from IDCT Mismatch", Mar. 1993.

Yagasaki, "Coding of Moving Pictures and Associated Audio–Oddification Problem for IDCT Miss–Match", Mar. 29, 1993.

Sang UK Lee, and IL Dong Yun, "On the Fixed–Point–Error Analysis of Several Fast DCT Algorithms", Feb. 1993, pp. 27–41.

CCITT Recommendation H.261–"Video Codec for Audio-visual Services at p×64 Kbits/s", 1992.

Motion Pictures Expert Group Phase 1–"Coding of Moving Pictures and Associated Video for Digital Storage Media at up to about 1.5 Mbits/s", Committee draft ISO/IEC CD 11172, 1991.

Motion Pictures Expert Group Phase 2–"Coded Representation of Picture and Audio Information", Test Model 1, Draft Rev. 2, 1993.

*Primary Examiner*—Jeffrey A. Gaffin
*Assistant Examiner*—Jason H. Vick

[57] ABSTRACT

A novel method and apparatus is disclosed for controlling inverse discrete cosine transform ("IDCT") mismatch between an encoder and decoder using different IDCT implementations under all coding conditions. Sychronization between the encoder and decoder is forced by selectively setting certain small DCT coefficients, which are prone to mismatch, to zero at the encoder. Advantageously, the invention may be implemented solely in the encoder to minimize system complexity and cost, and allow for IDCT mismatch control utilizing conventional decoders.

24 Claims, 3 Drawing Sheets

MOTION VIDEO COMPRESSION SYSTEM WITH INVERSE DISCRETE COSINE TRANSFORM MISMATCH CONTROL

TECHNICAL FIELD

This invention relates to data compression. More particularly, this invention relates to controlling inverse discrete cosine transform mismatch between an encoder and a decoder.

BACKGROUND OF THE INVENTION

The Discrete Cosine Transform ("DCT") has been widely used in digital signal processing, especially for image and speech because it approaches the statistically optimal Karhunen-Loeve transform for highly correlated signals. For image compression applications, the two-dimensional separable DCT has been widely used in many international image compression standards, such as the Joint Photographic Experts Group, ("JPEG"), Comité Consulatif International Télégraphique et Téléphonique Recommendation H.261-Video Codec for Audiovisual Services at px64 Kbit/s ("CCITT H.261") and the Motion Pictures Expert Group Phase 1 and Phase 2 video compression standards ("MPEG-1 and MPEG-2").

While DCTs may be implemented by software on general-purpose digital computers, they are more typically implemented by dedicated hardware in video encoders and decoders. In the case of hardware implementation, fixed point arithmetic is normally employed because of speed requirements for the hardware. However, there is an inherent accuracy problem due to the finite word length in fixed-point arithmetic. For image compression, when an encoder and decoder use inverse DCT ("IDCT") with different implementations, by using either a different IDCT method or different arithmetic precision, a difference may occur in the reconstructed pixels between the encoder and the decoder until intraframe data is sent to the decoder for refresh. This difference may accumulate and become visible in the decoded picture. This phenomena is called IDCT mismatch since the visible distortion in the decoded picture is caused by different IDCT implementations in the encoder and decoder. IDCT mismatch is a serious problem for high quality coding schemes such as those conforming to the MPEG-1 and MPEG-2 standards. Thus, in order to get high coding quality, IDCT mismatch must be controlled.

There have been several approaches to controlling IDCT mismatch. One approach is known as intra refreshing. In intra refreshing, an image sequence is cyclically intra-frame coded which allows the current picture to be coded without reference to either previous pictures or future pictures. Thus, any distortion accumulated in the reference picture cannot affect the current picture. This approach may be effective in removing errors caused by either IDCT mismatch or coding. However, as the refresh interval is restricted by bitrate and bandwidth limitations, a chosen refresh interval may not adequately control IDCT mismatch. Moreover, since intra-frame-coded pictures require more bits to be coded than do inter-frame-coded pictures, considerable coding efficiency may be lost if the refresh interval is small enough to avoid IDCT mismatch. Therefore, the intra refreshing approach may not be a good solution to the IDCT mismatch problem under all conditions.

Another approach to controlling IDCT mismatch includes oddification methods which must be used in both the encoder and decoder. In this approach, the reconstructed or dequantization data is oddified at both the encoder and the decoder sides before the IDCT step. Oddification methods may give good results for low to medium quality coding since the oddification of the reconstructed value may prevent distortion from accumulating in the decoder. However, oddification cannot control IDCT mismatch under all coding conditions, nor is it suitable for high quality coding.

SUMMARY OF THE INVENTION

IDCT mismatch may be controlled under all coding conditions, in accordance with one example of the invention, by a novel apparatus and method which forces synchronization between an encoder and decoder by selectively setting certain small DCT coefficients, which are prone to mismatch, to zero at the encoder. Advantageously, the invention may be implemented solely in the encoder to minimize system complexity and cost, and allow for IDCT mismatch control utilizing conventional decoders.

The discussion in this Summary and the following Brief Description of the Drawings, Detailed Description, and drawings only deals with examples of this invention and is not to be considered in any way a limitation on the scope of the exclusionary rights conferred by a patent which may issue from this application. The scope of such exclusionary rights is set forth in the claims at the end of this application.

DETAILED DESCRIPTION

Figure 1:
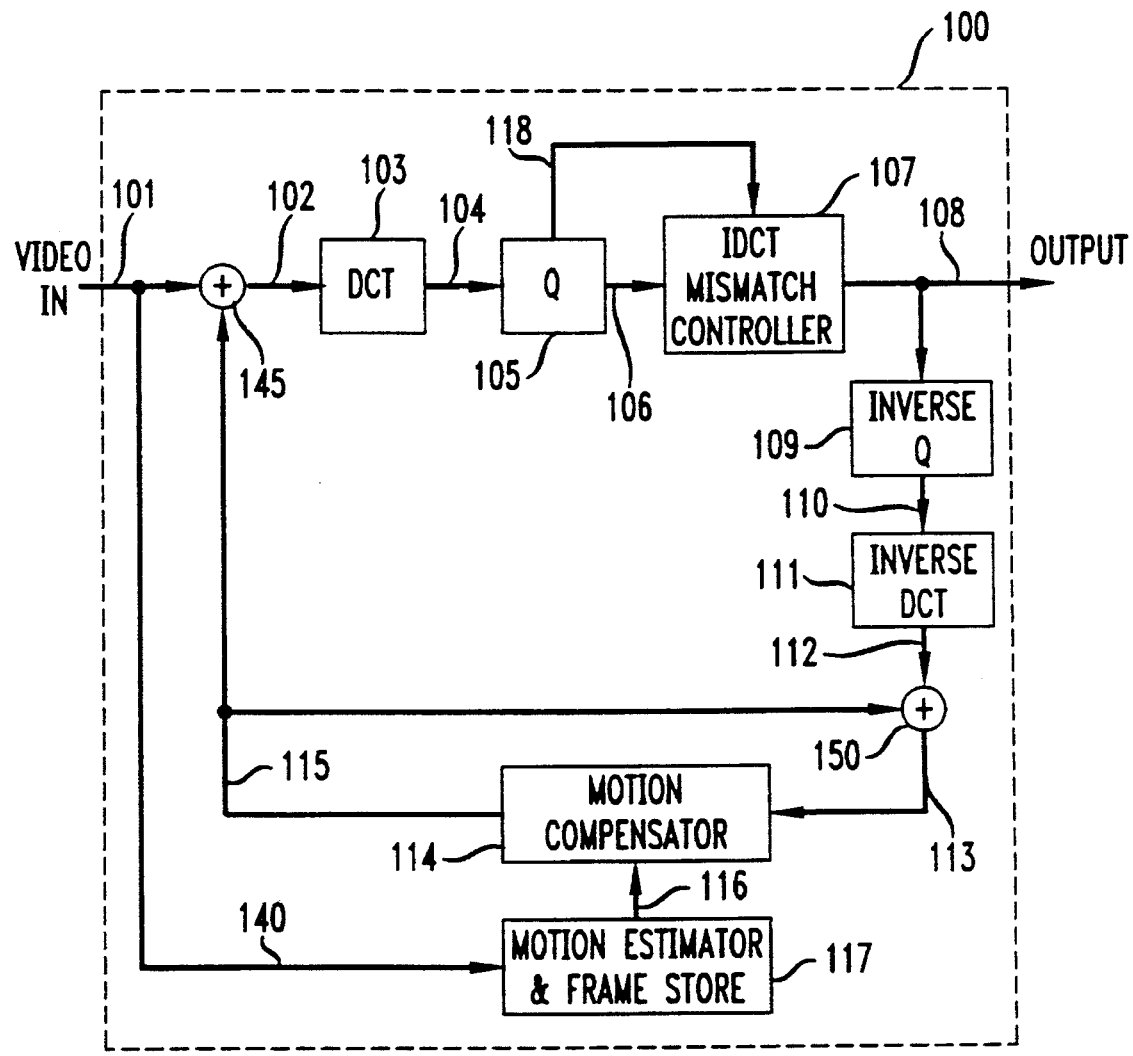
FIG. 1 is a simplified block diagram of an illustrative video encoder embodying principle in accordance with the invention.

It will be helpful to begin with a brief theoretical exposition of the phenomena called inverse discrete cosine transform ("IDCT") mismatch. Generally speaking, IDCT mismatch is the accumulation of the IDCT error caused by the finite length arithmetic in the computation of the IDCT in the encoder and the decoder. The two dimensional 8×8 discrete cosine transform ("DCT") used in the image compression is defined as:

$$X_{k,l} = \frac{1}{4} C(k)C(l) \sum_{i=0}^{7} \sum_{j=0}^{7} x_{i,j} \cos\left(\frac{k(2i+1)\pi}{16}\right) \cos\left(\frac{l(2j+1)\pi}{16}\right) \quad (1)$$

The inverse 8×8 DCT ("IDCT") is defined as:

$$X_{i,j} = \frac{1}{4} \sum_{k,l=0}^{7,7} C(k)C(l)X_{k,l}\cos\left(\frac{k(2i+1)\pi}{16}\right) \cos\left(\frac{l(2j+1)\pi}{16}\right) \quad (2)$$

and $$C(k), C(l) = \begin{cases} 1/\sqrt{2} & \text{if } k,l = 0 \\ 1 & \text{otherwise} \end{cases} \quad (3)$$

where i, j are the coordinates in the time domain, k, l are the coordinates in the transform domain, $X_{k,l}$ are DCT coefficients, and $x_{i,j}$ are pixel values or pixel residuals. Those skilled in the art will appreciate that DCTs and IDCTs may be implemented using various methods. For example, they may either use full matrix multiplications, which is also called the direct form implementation, or different fast algorithms with their sparse matrices. For full matrix multiplication, Equation (2) can be rewritten as:

$$x_{i,j} = k_{i,j} = \sum_{k,j=0,0}^{7,7} C_{i,j,k,l} X_{k,l} \qquad (4)$$

where $$C_{i,j,k,l} = \frac{1}{4} C(k) C(l) \cos\left(\frac{k(2i+1)\pi}{16}\right) \cos\frac{l(2j+1)\pi}{16}) \qquad (5)$$

and $$C(k), C(l) = \begin{cases} 1/\sqrt{2} & \text{if } k, l = 0 \\ 1 & \text{otherwise} \end{cases} \qquad (6)$$

If all DCT coefficients are zero except $X_{0,0}$ $X_{4,0}$, and $X_{4,4}$, then since $$C_{i,j,0,0} = \frac{1}{8},$$

$$C_{i,j,0,4} = \frac{1}{4\sqrt{2}} \cos\frac{(2j+1)\pi}{4},$$

$$C_{i,j,4,0} = \frac{1}{4\sqrt{2}} \cos\frac{(2i+1)\pi}{4},$$

$$C_{i,j,4,4} = \frac{1}{4} \cos\frac{(2j+1)\pi}{4} \cos\frac{(2i+1)\pi}{4}.$$

$x_{i,j}$ can be written as $$x_{i,j} = \frac{1}{8} X_{0,0} + \frac{1}{4\sqrt{2}} X_{0,4} \cos\frac{2j+1}{4} \pi + \qquad (7)$$

$$\frac{1}{4\sqrt{2}} X_{4,0} \cos\frac{2i+1}{4} \pi + \frac{1}{4} X_{4,0} \cos\frac{2i+1}{4} \pi \cos\frac{2j+1}{4} \pi,$$

and $x_{0,0}$ is $$x_{0,0} = \frac{1}{8} *(X_{0,0} + X_{0,4} + X_{4,0} + X_{4,4}). \qquad (8)$$

When $X_{0,0} \pm X_{0,4} \pm X_{4,0} \pm X_{4,4} = \pm 4, \pm 12, \ldots, x_{0,0}$ can be exact value I+0.5, where I is any integer number. Since different implementations have different ways of computing the $x_{0,0}$, the value of $x_{0,0}$ after rounding can be either I or I+1 depending on the actual implementation and truncation of the word length. That is, when the encoder and decoder use different IDCTs, the reconstructed integer data may differ by 1.

A more specific example is shown below. In this example, for the same DCT coefficients, the reconstructed data from an exact IDCT are all 0s, while the data obtained from a finite accuracy IDCT are 0s and 1s.

$$DCT \text{ coefficients} = \begin{bmatrix} 2 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 2 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}, \qquad (9)$$

-continued $$IDCT1(\text{float}) = \begin{bmatrix} 0.5 & 0.5 & 0.5 & 0.5 & 0.5 & 0.5 & 0.5 & 0.5 \\ 0.5 & 0.5 & 0.5 & 0.5 & 0.5 & 0.5 & 0.5 & 0.5 \\ 0.5 & 0.5 & 0.5 & 0.5 & 0.5 & 0.5 & 0.5 & 0.5 \\ 0.5 & 0.5 & 0.5 & 0.5 & 0.5 & 0.5 & 0.5 & 0.5 \\ 0.5 & 0.5 & 0.5 & 0.5 & 0.5 & 0.5 & 0.5 & 0.5 \\ 0.5 & 0.5 & 0.5 & 0.5 & 0.5 & 0.5 & 0.5 & 0.5 \\ 0.5 & 0.5 & 0.5 & 0.5 & 0.5 & 0.5 & 0.5 & 0.5 \\ 0.5 & 0.5 & 0.5 & 0.5 & 0.5 & 0.5 & 0.5 & 0.5 \end{bmatrix}, \qquad (10)$$

$$IDCT1(int) = \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}, \qquad (11)$$

$$IDCT2(int) = \begin{bmatrix} 1 & 1 & 1 & 1 & 1 & 1 & 1 & 1 \\ 0 & 0 & 0 & 0 & 0 & 0 & 0 & 0 \\ 0 & 0 & 0 & 0 & 0 & 0 & 0 & 0 \\ 1 & 1 & 1 & 1 & 1 & 1 & 1 & 1 \\ 1 & 1 & 1 & 1 & 1 & 1 & 1 & 1 \\ 0 & 0 & 0 & 0 & 0 & 0 & 0 & 0 \\ 0 & 0 & 0 & 0 & 0 & 0 & 0 & 0 \\ 1 & 1 & 1 & 1 & 1 & 1 & 1 & 1 \end{bmatrix}, \qquad (12)$$

Here, the DCT coefficients are zeros except $X_{0,0}$ and $X_{0,4}$. IDCT1 (float) is the reconstructed data represented by 64-bit floating point and obtained from the direct form implementation without rounding. IDCT1(int) is the reconstructed data represented by 32-bit fix point and obtained from the direct form implementation with rounding and truncation. IDCT2(int) is the reconstructed value represented by 32-bit fix point and obtained by using fast implementation with rounding and truncation. It will be appreciated from the previous analysis and examples that any data close to I+0.5 in IDCT computation, where I can be any integer number, is the source for IDCT mismatch when different IDCT implementations are involved. Thus, if the precision for calculation and representation are different, the same input could produce totally different output.

FIG. 1 is a simplified block diagram of an illustrative video encoder in accordance with the invention. A digital image sequence signal VIDEO IN is supplied as input to encoder 100 on line 101. Depending on whether intra- or inter-coding is utilized, VIDEO IN is sent to DCT coefficient generator 103 or motion estimator and frame store 117. For purposes of this example, coding is performed on a macroblock basis. However, those skilled in the art will appreciate that the principles of the invention may also be applied on a picture basis. In intra-coding mode 102, VIDEO IN is directly supplied as input to intra/inter DCT coefficient generator 103. In inter-coding mode, VIDEO IN is supplied as input to motion estimator and frame store 117 on line 140, where motion vectors are estimated. Those skilled in the art will appreciate that the motion vectors can be unidirectional or bi-directional depending on the picture type. The motion vectors and the current input frame on line 116 is supplied as input to motion compensator 114, where the prediction of the current frame is computed. The predicted signal of the current frame on line 115 is subtracted from VIDEO IN on line 101 in adder 145 to form a residual signal on line 102. The residual signal on line 102 is supplied as input to intra/inter DCT coefficient generator 103.

The DCT transform coefficients are output from intra/inter DCT coefficient generator 103 on line 104 to quantizer 105, where the coefficients are quantized by using flat or steep quantization matrix similar to those specified in MPEG-1 standard. The quantized coefficients on line 106 and the quantization step size mquant on line 118 are supplied as inputs to IDCT mismatch controller 107. IDCT mismatch controller 107 processes the quantized coefficents, in accordance with the invention, to produce an output signal on line 108 which may be transmitted to a remote decoder (not shown). In order to produce the reconstructed picture, on line 115, the output signal on line 108 is supplied as input to inverse quantizer 109, where the quantized DCT coefficients are reconstructed. The reconstructed DCT coefficients on line 110 are supplied as an input to inverse DCT generator 111 to produce the reconstructed data. The reconstructed data from inverse DCT generator 111 output on line 112 may be pixel data, or residual data corresponding to the intra- and inter-coding modes. In intra-coding mode, the reconstructed data on line 112 equals the signal on line 113, and is stored in motion compensator 114. In inter-coding mode, the signal on line 113 is obtained by the reconstructed data on line 112 and the predicted signal on line 115 which are summed together in adder 150.

As stated above, IDCT mismatch may be controlled by processing the quantized DCT coefficients in IDCT mismatch controller 107. Advantageously, the control need only be performed in the encoder. Details of the operations performed in IDCT mismatch controller 107 are described below.

Let q_coeff(i, j), i, j=0,1, . . . , 7 be the quantized DCT coefficients, on line 106, and mquant be the quantization step size, on line 116. For an intra-coded macroblock, there is no modification of q_coeff. For inter-coded macroblocks, if we define the absolute sum of the quantized coefficients as $$A\_SUM = \sum_{i=0}^{7} \sum_{j=0}^{7} |q\_coeff(i,j)|, \quad (13)$$

then $$\text{if}(A\_SUM < T_a \text{ and } mquant < T_b) \quad (14)$$
$$q\_coeff(i,j) = 0, i,j = 0,1, \ldots 7.$$

where $T_1$, $T_b$ are predetermined thresholds. IDCT mismatch controller 107 sets some small DCT coefficients to zero according to Equation 14. Thus, by forcing some small DCT coefficients to zeros at the encoder, the encoder and decoder are forced to synchronize because determination of zero-valued coefficients is not affected by IDCT implementation. As will be appreciated by those skilled in the art, forcing small coefficients to zero has negligible effect on picture quality.

Figure 2:
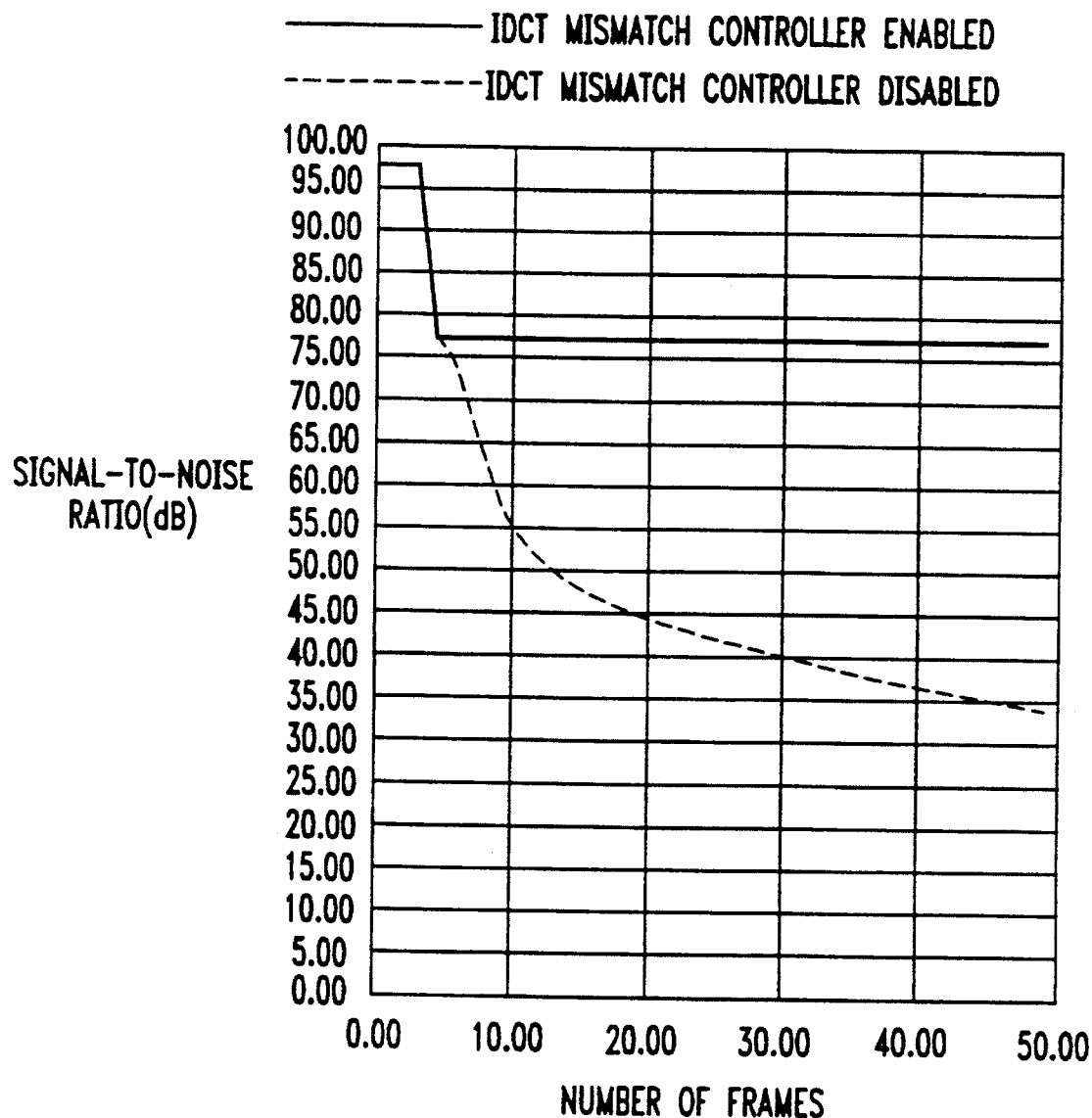
FIG. 2 shows comparative experimental results illustrating improved signal-to-noise ratios achievable with the invention.
Figure 3:
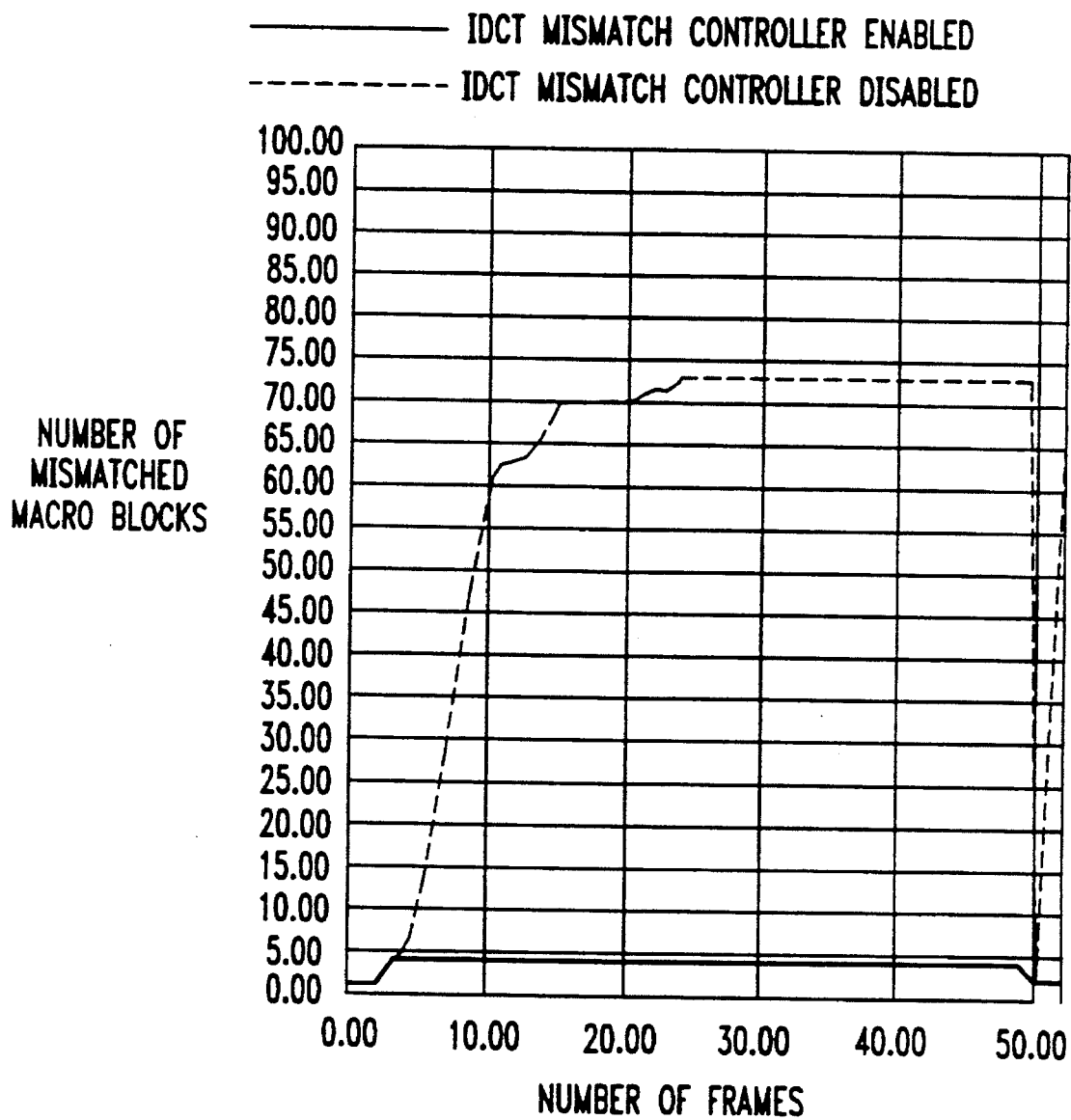
FIG. 3 shows comparative experimental results illustrating improvement in the number of mismatched macroblocks achievable with the invention.

FIGS. 2 and 3 show comparative experimental results illustrating improvements in IDCT mismatch achievable with the invention. FIG. 2 shows comparative experimental results illustrating improved signal-to-noise ratios achievable with the invention. As shown, when IDCT mismatch controller 107 (FIG. 1) is disabled, the signal-to-noise ratio of the decoded picture rapidly decreases with an increasing number of coded frames. When IDCT mismatch controller 107 is enabled, the the signal-to-noise ratio remains constant with an increasing number of frames. FIG. 3 shows comparative experimental results illustrating improvement in the number of mismatched macroblocks achievable with the invention. When IDCT mismatch controller 107 is disabled, the number of mismatched macroblocks increases with the number of frames. When IDCT mismatch controller is enabled, the number of mismatched macroblocks remains constant. The values of $T_a$ and $T_b$ used in the experiments, the results of which are shown in FIGS. 2 and 3, were 3 and 2, respectively. Of course, those skilled in the art will appreciate that other values of $T_a$ and $T_b$ could also be used to achieve IDCT mismatch control depending upon the specific application and circumstances.

We claim:

1. An inverse discrete cosine transform mismatch controller, comprising:

a means for receiving a set of quantized discrete cosine transform coefficients each having an associated quantization step size, wherein said set represents at least one image in a sequence;

a means for summing said received quantized discrete cosine transform coefficients in said set;

a means for setting particular ones of said quantized discrete cosine transform coefficients in said set to zero when said quantization step size associated with said particular ones of said quantized discrete cosine transform coefficients is less than a first predetermined value and said sum Of said received quantized discrete cosine transform coefficients in said set is less than a second predetermined value.

2. The controller of claim 1 wherein said means for summing further includes a means for absolutely summing said received quantized discrete cosine transform coefficients in said set.

3. The controller of claim 1 wherein said received quantized discrete cosine transform coefficients are generated by discrete cosine transform coding on a macroblock basis.

4. The controller of claim 1 wherein said received quantized discrete cosine transform coefficients are generated by discrete cosine transform coding on a picture basis.

5. The controller of claim 3 wherein said discrete cosine transform coding comprises inter-frame discrete cosine transform coding.

6. The controller of claim 4 wherein said discrete cosine transform coding comprises inter-frame discrete cosine transform coding.

7. The controller of claim 1 further including a means for selectively enabling and disabling said controller in response to a selected coding mode.

8. The controller of claim 7 wherein said selected coding mode comprises inter-coding of said image in said sequence.

9. The controller of claim 7 wherein said selected coding mode comprises intra-coding of said image in said sequence.

10. The controller of claim 1 wherein said first predetermined value is substantially equal to 2.

11. The controller of claim 1 wherein said second predetermined value is substantially equal to 3.

12. The controller of claim 1 wherein said set of discrete cosine transform coefficients represent at least one video image.

13. The controller of claim 1 further including a means for transmitting at least said zero-valued discrete cosine transform coefficients to said decoder.

14. An encoder, comprising:

input means for receiving at least one image in a sequence;

a discrete cosine transformer, coupled to said input means, for generating a set of discrete cosine transform coefficients in response to said received image;

a quantizer coupled to said discrete cosine transformer, for receiving said set of discrete cosine transform coefficients and for generating a first set of quantized discrete cosine transform coefficients;

an inverse discrete cosine transform mismatch controller, coupled to said quantizer, said inverse discrete cosine transform mismatch controller including a means for selecting particular ones of said first set of quantized discrete cosine transform coefficients according to at least one selection criterion, and a means for setting values of said selected discrete cosine transform coefficients in said first set to zero to generate a second set of quantized discrete cosine transform coefficients so that an error rate of inverse discrete cosine transformations performed by a remotely located decoder is reduced when said second set is received by said decoder; and an inverse discrete cosine transformer, coupled to said discrete cosine transformer and said inverse discrete cosine transform mismatch controller, for receiving said second set and generating a predicted signal for feedback to said discrete cosine transformer.

15. The encoder of claim 14 further including a means for transmitting at least said second set of quantized discrete cosine transform coefficients to a decoder.

16. The encoder of claim 14 wherein said at least one selection criterion includes a result of a comparison between a quantization step size associated with selected quantized discrete cosine transform coefficients and a first predetermined value.

17. The encoder of claim 14 wherein said at least one selection criterion further includes a result of a comparison between a sum of said first set of quantized discrete cosine transform coefficients in said first set and a second predetermine value.

18. A method for reducing inverse discrete cosine transform mismatch between an encoder and a decoder, the method comprising the steps of:

generating a set of quantized discrete cosine transform coefficients representative of at least one image in a sequence;

selecting particular ones of said set of quantized discrete cosine transform coefficients according to at least one selection criterion; and setting values of said selected quantized discrete cosine transform coefficients in said set to zero to improve a synchronization of inverse discrete cosine transformations performed by said decoder relative to inverse discrete transformations performed by said encoder when said zero-valued coefficients are received by said decoder.

19. The method of claim 18 further including a step of transmitting at least said zero-valued discrete cosine transform coefficients to said decoder.

20. The method of claim 18 wherein said step of selecting includes comparing a quantization step size associated with said selected discrete cosine transform coefficients with a first predetermined value.

21. The method of claim 18 wherein said step of selecting includes comparing a sum of said discrete cosine transform coefficients in said set with a second predetermined value.

22. The method of claim 18 wherein said first predetermined value is substantially equal to 2.

23. The method of claim 18 wherein said second predetermined value is substantially equal to 3.

24. A method comprising the steps of:

(a) summing a set of quantized discrete cosine transform coefficients;

(b) comparing said summed quantized discrete cosine transform coefficients to a first predetermined value;

(c) comparing a quantization step size associated with particular ones of said quantized discrete cosine transform coefficients in said set to a second predetermined value; and (d) setting, in response to results of comparisons performed in steps (b) and (c), discrete cosine transform coefficients in said set of zero so that an error rate of inverse discrete cosine transformations performed by said decoder is improved when said zero-valued coefficients are received by said decoder.

* * * * *